(12) United States Patent
Miller

(10) Patent No.: US 7,476,375 B1
(45) Date of Patent: Jan. 13, 2009

(54) FUSION FUEL CONTAINERS AND SYSTEM

(75) Inventor: Edward Donald Miller, Le Grand, CA (US)

(73) Assignee: Carbon Labs, Inc., Le Grand, CA (US)

( * ) Notice: Subject to any disclaimer, the term of this patent is extended or adjusted under 35 U.S.C. 154(b) by 297 days.

(21) Appl. No.: 11/278,652

(22) Filed: Apr. 4, 2006

Related U.S. Application Data

(60) Provisional application No. 60/783,543, filed on Mar. 18, 2006, provisional application No. 60/668,436, filed on Apr. 4, 2005.

(51) Int. Cl.
*C01B 31/02* (2006.01)
*B82B 1/00* (2006.01)

(52) U.S. Cl. .................... 423/445 B; 977/734; 977/735; 977/736

(58) Field of Classification Search ............. 423/445 B, 423/447.1, 447.2; 977/734, 735, 736
See application file for complete search history.

(56) References Cited

U.S. PATENT DOCUMENTS 5,648,523 A * 7/1997 Chiang ........................ 562/100

OTHER PUBLICATIONS

Komatsu, et al., Encapsulation of Molecular Hydrogen in Fullerence C60 by Organic Synthesis, Science 2005; 307: 238-240.*
Seifert, et al., On the formation of deuterium fullerence complexes in collisions of C60⁻¹ with D2, Physics Letters A 1994; 188: 365-370.*
Darzynkiewicz, et al., Noble Gas Endohedral Complexes of C60 Buckminsterfullerence, J. Phys. Chem. A 1997; 101: 7141-7144.*
Campbell, et al., Collision energy dependence of He and Ne capture by C60+, Z. Phys. D 1992; 23: 1-2.*
Tarasov, et al., Russian Chemical Reviews 2001; 70(2): 131-146.*
Rogner, et al., Hydrogenated and chlorinated fullerences detected by "cooled" modified matrix-assisted laser desorption and ionization mass spectroscopy (MALDI-MS), Intl. J. Mass Spectrometry and Ion Proc. 1996; 156: 103-108.*
Shul'ga, et al., On the Thermal Decomposition of the C60D19 Deuterium Fullerite, Physics of the Solid State 2002; 44(3): 545-547.*
Shul'ga, et al., Crystalline fullerence deuteride C60D24: Spectral Investigation, Physics of the Solid State 1999; 41(8): 1391-1397.*
Somenkov, et al., Neutron Diffraction Study of the Structure of Deuterated and Fluorinated Fullerence C60, Metal Science and Heat Treatment 2000; 42(7): 319-325.*
Tarasov, et al., Hydrogenation of fullerites in the presence of intermetallic compounds or metals, Russian Chem. Bulletin 1997; 46(4): 649-652.*
Krapp, et al., Is This a Chemical Bond? A Theoretical Study of Ng2@C60 (Ng=He, Ne, Ar, Kr, Xe), Chemistry: A European Journal 2007; 13: 8256-8270.*
Dresselhaus, et al., Science of Fullerenes and Carbon Nanotubes, pp. 60-79, Academic Press, Inc. 1999.*

* cited by examiner

*Primary Examiner*—Stuart L. Hendrickson
*Assistant Examiner*—Daniel C. McCracken
(74) *Attorney, Agent, or Firm*—Perkins Coie LLP

(57) ABSTRACT

A fusion fuel composition has two or more light nuclei combined with a cage-like molecule. The light nuclei may be, for example, deuterium and tritium, and the cage-like molecule may be, for example, a fullerene molecule. A fusion reaction to consume the fusion fuel may be ignited, for example, via compression methods including chemical or laser.

3 Claims, 4 Drawing Sheets

FUSION FUEL CONTAINERS AND SYSTEM

RELATED APPLICATIONS

This application claims the benefit of priority of U.S. Provisional Patent Application Ser. No. 60/668,436, filed Apr. 4, 2005 entitled "CAGE-LIKE MOLECULE FOR USE AS FUSION FUEL" and U.S. Provisional Patent Application Ser. No. 60/783,543, filed Mar. 18, 2006, also entitled "CAGE-LIKE MOLECULE FOR USE AS FUSION FUEL," all of which are hereby incorporated herein by this reference.

BACKGROUND

1. Field

The present disclosure generally relates to fuels suitable for use in fusion reactions, and more particularly to cage-like nanoscale molecules suitable to contain and support light nuclei.

2. General Background

In nuclear fusion, two light nuclei can be combined to form a heavier nucleus and release excess binding energy—this is commonly called "fusion." When the two light nuclei are combined, the resultant product's mass is slightly less than the original light nuclei. The difference in mass is released as energy according to Einstein's formula $E=mc^2$.

An example of two light nuclei combining is the combination of deuterium and tritium into helium. Light nuclei include hydrogen, deuterium, tritium, helium, helium-3, beryllium, lithium-6, lithium-7, and boron.

Hydrogen is the smallest atom and contains a single proton coupled with a single electron. When hydrogen has its electron removed it is sometimes referred to as protium, as it is a single proton. Deuterium is a natural isotope of hydrogen that is comprised of a nucleus containing one neutron and one proton. Deuterium combined with oxygen in the form of $D_2O$ is referred to as heavy water and is used in fission plants to moderate neutrons and breed tritium. Tritium is comprised of a nucleus containing two neutrons and one proton. Tritium is an isotope of hydrogen that is created by the capture of a neutron by deuterium or lithium-6 such as in a nuclear reaction that occurs in a fission plant. Tritium is radioactive and has a half-life of about 12.4 years. Tritium occurs naturally due to cosmic rays interacting with deuterium in the atmosphere. Hydrogen, deuterium, and tritium are chemically interchangeable and exhibit similar properties.

Fusion, which is the combining of nuclei, can be made to occur under conditions of nuclei confinement which require very high temperatures, and compressing the mixture of nuclei to be combined to high density for adequate time. One way this is currently done is inertial confinement fusion (ICF) in which a high energy multibeam laser irradiates a pellet containing deuterium or D/T mixture. Another method involves using femtosecond pulsed lasers. In all of these methodologies the presence of carbon in the vicinity of plasma generation in such fusion methods as ICF, magnetic fusion and smaller scale femtosecond terawatt pulsed laser induced fusion is currently viewed as being detrimental to the reaction because carbon comes off the stainless steel walls of the reaction chambers and produces a cooling effect on the plasma that is detrimental. One existing approach to producing nuclear fusion in a controlled manner uses a fuel that combines deuterium and tritium in glass microspheres that typically have spherical geometries of 10 to 2,000 micrometers in diameter. This is one form of the so-called "internal confinement" fuel. High intensity beams are used to heat the shell or core of the microspheres sufficiently to cause fusion of the light nuclei contained inside. However, a challenge with this and other confinement fusion approaches is the need for even, simultaneous heating and uniform compression of the light nuclei.

Accordingly, a container device is needed that facilities the transfer of high temperature and compression to light nuclei for sufficient time to combine the nuclei. It would also be desirous to have a container device including an array of containers which increase the density of non-confined light nuclei subject to temperature and compression.

SUMMARY

One or more cage-like molecules can each hold and or support at least two light nuclei to form a container device in accordance with the present disclosure. The light nuclei may be, for example, deuterium and tritium encapsulated inside each cage-like molecule. Thus the composition of the container device comprises two or more light nuclei enclosed in a cage-like molecule in some exemplary implementations.

In some exemplary implementations the composition of the container device comprises a plurality of cage-like molecules, with one or more light nuclei light nuclei externally attached.

In some exemplary implementations the composition of the container device comprises one or more light nuclei externally attached to the container device which may comprise a plurality of cage-like molecules, such as fullerenes, in an array structure.

In some exemplary implementations the composition of the container device comprises a high density of light nuclei with light nuclei externally attached to the container device which may comprise a plurality of cage-like molecules, such as fullerenes, in an array structure.

In some exemplary implementations the composition of the container device comprises one or more light nuclei internally enclosed in a cage-like molecules, such as fullerenes, in an array structure.

In some exemplary implementations the composition of the container device comprises two or more light nuclei light associated with the cage-like molecule being internally contained or externally attached and additional energetic groups attached externally to the cage-like molecule.

In some exemplary implementation the container system comprises one or more cage-like containers with light nuclei enclosed and or attached and in close association with enhancement compounds.

Other features and advantages of the present disclosure will be set forth, in part, in the descriptions which follow and the accompanying drawings, wherein the exemplary implementations of the present invention are described and shown, and in part, will become apparent to those skilled in the art upon examination of the following detailed description taken in conjunction with the accompanying drawings or may be learned by practice of the present disclosure. The advantages of the present disclosure may be realized and attained by means of the instrumentalities and combinations particularly pointed out in the appended claims.

BRIEF DESCRIPTION OF THE DRAWINGS

For a more complete understanding of the present disclosure, reference is now made to the following figures, wherein like reference numbers refer to similar items throughout the figures.

Figure 1:
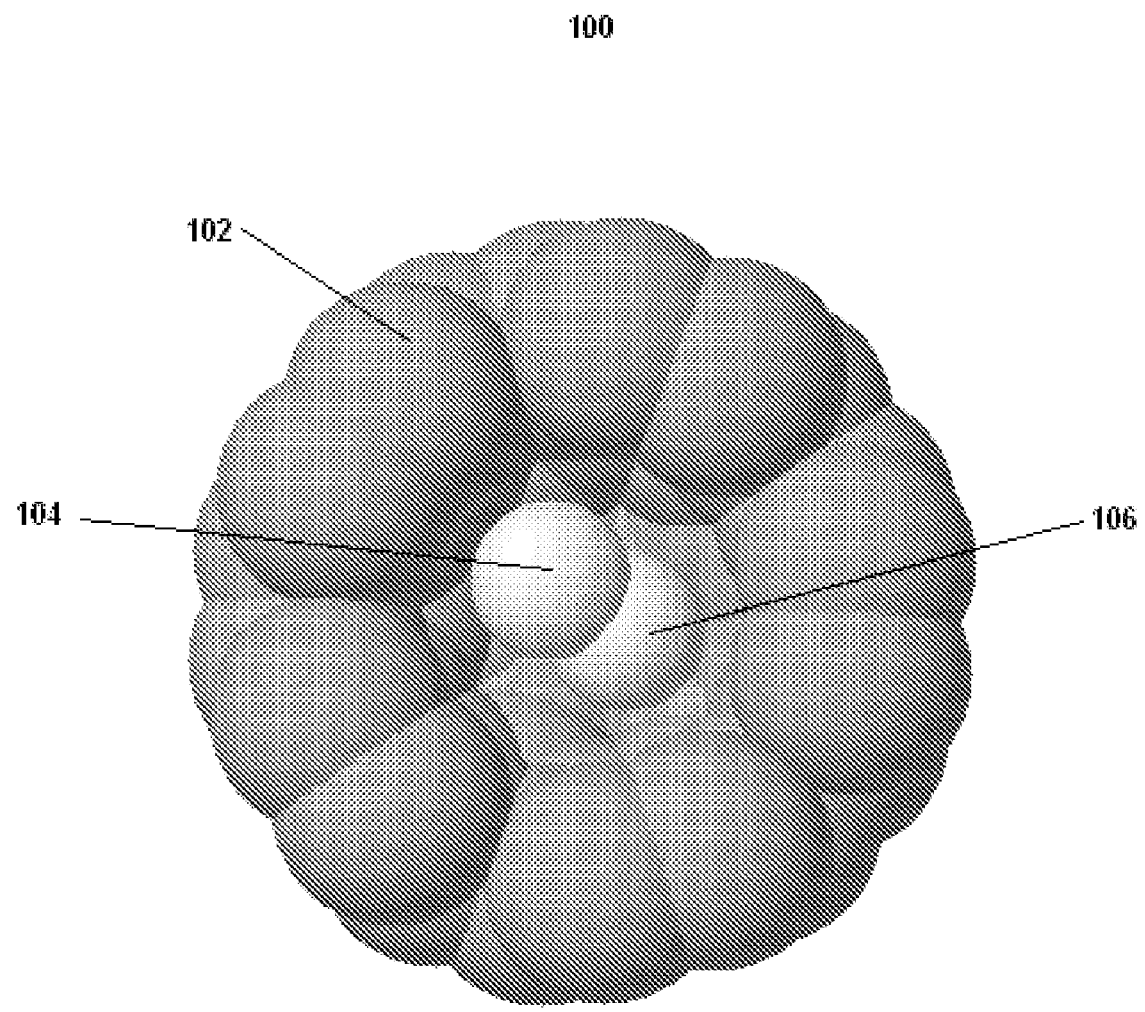
FIG. 1 illustrates a cage-like molecule encapsulating two light nuclei.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION OF THE EMBODIMENTS OF THE DISCLOSURE

A. Definitions

As used herein, the term "cage-like molecule" means a hollow three-dimensional molecule. The term "cage-like molecule" includes, but is not limited to the following: (i) fullerenes including but not limited to C60 fullerene; (ii) azafullerenes; (iii) molecules comprising eight or more individual atoms selected from the following categories of atoms: carbon, nitrogen, boron, silicon, and titanium. By way of example, a cage-like molecule according to the foregoing subsection (iii) may include combinations such as four carbon atoms and four boron atoms. Examples of cage-like molecules include, but are not limited to, nanoscale materials referred to as buckyballs, fullerene clusters, nanotubes, nanocapsules, nanopolyhedra, cones, cubes and onions, and also to nanoscale materials having a closed cage structure.

As used herein, the term "endohedral" means internal relative to the cage-like molecule.

As used herein, the term "exohedral" means attached to the exterior of the cage of the cage-like molecule.

As used herein, the term "light nuclei" means an individual element or isotope with an atomic weight of 11 or less. The term "light nuclei" includes, but is not limited to, materials selected from the following group: hydrogen, deuterium, tritium, helium, helium-3, beryllium, lithium-6, lithium-7, and boron.

As used herein, the term "high-Z material" includes, but is not limited to, materials formed from the following atoms: beryllium, bismuth, cesium, gadolinium, gold, hafnium, iron, lead, mercury, palladium, platinum, plutonium, polonium, silver, tantalum, thorium, tungsten, and uranium.

As used herein, the terms "tamper material" and "reflector material" are interchangeable and mean a material that is effective at reflecting neutrons and includes, but is not limited to, beryllium, bismuth, cesium, gadolinium, gold, hafnium, iron, lead, mercury, palladium, platinum, plutonium, polonium, silver, tantalum, thorium, tungsten, and uranium.

As used herein, the term "pusher material" means a material used to push or enhance compression.

As used herein, the term "hohlraum material" means a material that assists in the even heating of the light nuclei in a fusion fuel.

As used herein, the term "energetic group" means a molecular group or groups that enable rapid chemical disassociations. The term "energetic group" includes, but is not limited to, $NO_2$, $NF_2$, $NH_2$, and other nitro groups. Energetic groups are often used, for example, to provide the source of energy when combined with organic materials to make conventional explosives.

As used herein, the term "enhancement group" means a material that acts as one or more of the following: a tamper material, a pusher material, a reflector material, or a high-Z material. Exemplary enhancement groups include certain metals and heavy elements.

B. Exemplary Implementations

Devices in accordance with the present disclosure include cage-like containers and arrays of cage-like containers. These devices contain and/or support light nuclei and communicate physical states to the light nuclei such as pressure, compression and temperature. These container devices are described in more detail below.

A number of materials can be used to provide cage-like molecular container devices and or arrays of cage-like molecular containers. Many molecular containers or cages are based on carbon structure molecules. Additionally, N10 forms a cage-like structure. In general, cage-like molecules may be formed from a number of different atoms and may include molecules comprising eight or more atoms selected from the following group: carbon, nitrogen, boron, silicon, and titanium. Some cage-like molecular forms may not necessarily contain carbon. For example, a boron nitride molecule may be formed to be a cage-like molecule. Cage-like molecules form a partially hollow three dimensional structure. The cage-like molecules allow for the addition of molecules which may be useful to manipulate the opening and closing of the bonds forming the cage to encapsulate other material. Cage-like molecules can and do exist independently of the light nuclei that they are combined with as discussed further in this disclosure.

FIG. 1 illustrates a device 100 comprising a cage-like molecule 102. A first light nuclei 104 and a second light nuclei 106 are encapsulated in the cage-like molecule 102. The cage-like molecule described herein typically has an outer diameter of less than about 1,000 nm, and more typically between about 10 to 500 nm.

Carbon can be used to form many suitable types of cage-like molecules for use in fusion fuels. Carbon itself exists in several molecular forms called allotropes. The forms are characterized by the alignments of the atoms in a regular structure. Each structural formation exhibits unique and useful properties. The first form is amorphous, which is carbon that is burned without sufficient oxygen, and is commonly referred to as soot. The second form of carbon is known as graphite and is structured as in the form of interconnected hexagonal rings that make up a flat plane. Another form of carbon is known as diamond and is structured as a three-dimensional network where each carbon atom is connected to four other carbon atoms by individual bonds. Yet another form of carbon is known as fullerenes, and it is this form of carbon that is generally suitable for use as a cage-like molecule in a fusion fuel as described herein.

Fullerenes are large molecules of carbon in the form of a hollow polyhedral molecule typically containing 32 to several hundred carbon atoms. Fullerenes containing 60 carbons (C60), better known as Buckminsterfullerene or "buckyballs," are currently the most common and stable form. The C60 fullerene is shaped as a truncated icosohedron symmetry consisting of twelve five-membered rings and 20 six-membered rings and resembles the patchwork faces of a soccer ball. Another fullerene, C70, which is also very stable, contains 25 six-membered rings and has a shape roughly resembling a multi-faceted soccer-like ball. Two smaller examples of carbon cage-like molecules that are not typically considered to be fullerenes are cubane (C8) and dodecahedrane (C20).

Contained Light Nuclei

In accordance with the present disclosure, a fullerene is preferably used as the cage-like molecule for containing light nuclei and forming a fusion fuel. Fullerenes containing greater than about 30 carbon atoms are typically preferred, such as, for example, a number of carbon atoms falling with the range of about 60 to 84, or even more specifically a range of about 60 to 70. Many such forms of fullerenes are commercially available. Some of the characteristics of fullerenes include its pronounced combination of hardness and elasticity. It is known that compression of an endohedral fullerene will decrease the radii of the encapsulated material, and also that it is possible to compress fullerenes to ultra-hard densities while retaining their cage-like structure.

Fullerenes generally have the characteristic of being carbon polyhedra composed of nested, concentric layers of carbon, where the layers are composed largely of hexagons and pentagons, and the polyhedra typically have dimensions on the order of nanometers to hundreds of nanometers.

N60, for which a chemical synthesis procedure has not yet been found, is expected to form the same structure as C60 and also may be used as a cage-like molecule container in the fusion fuel described herein. Boron nitride typically forms vessel, hollow sphere, peanut, and onion structures. An example of a boron nitride structure that may be used as a cage-like molecule includes B36N36. Silicon that is formed via silicon clathrate forms fullerene-like polyhedra that also may be used as a cage-like molecule.

As mentioned above, in order to form a fusion fuel, the cage-like molecule may encapsulate one or more light nuclei. For example, a fullerene may encapsulate, for example, two or more deuterium atoms, or a deuterium and a tritium atom. The encapsulated atoms may fill or partially fill the innermost voids of the fullerene.

When light nuclei such as deuterium are incorporated inside of fullerenes (e.g., C60 fullerene), the resulting structure is commonly referred to as an endohedral structure. For example, the C60 fullerene molecule has a mean diameter of 7.1 Angstroms. Its hollow internal cavity permits the insertion of other elements, such as fusion fuel elements, inside the fullerene to provide what is commonly referred to as an "endohedral fullerene." Endohedral modifications typically involve deposition or insertion of atoms into the cavity within the cage. Hydrogen, deuterium, tritium, helium, helium-3, beryllium, lithium-6, lithium-7, boron, and other atoms may be encapsulated in fullerenes using known methods.

There are four common methods for making endohedral fullerenes, any of which in general may be used to encapsulate light nuclei within a cage-like fullerene molecule for use as a fusion fuel. In the first method, a material may be encapsulated within a fullerene by chemical modification of the fullerene's shell. A "molecular surgery" approach may be used that begins with the chemical creation of an opening within the fullerene cage. The opening process allows the introduction of an atomic or molecular species in a pressurized atmosphere, which can be followed by the "suturing" of broken bonds back onto the original framework. It is believed that an approach that sutures closed the chemical bonds described for this molecular surgery approach would be desirable in the formation of a fusion fuel container device in accordance with this disclosure. One particularly exemplary process for opening a fullerene, inserting light molecules within the opened fullerene, and the closing the fullerene structure to yield endohedral fullerenes is described below in more detail in Example 1.

In the second method, a light nuclei is encapsulated within a fullerene during production of the fullerene. For example, a metal complex such as lithium deuteride may be embedded into a carbon graphite rod from which fullerenes are grown. During the arc-vapor process the fullerenes then grow around the vaporized metal. This method may also be used with the laser creation of endohedral fullerenes.

In the third method, a material is encapsulated within a fullerene molecule by pressurization. Currently, gases are the only elements known to transition into the fullerenes via pressurization. Molecular helium, neon, argon, krypton, and xenon have been encapsulated into fullerenes via high pressure and high temperature. For example, at a pressure of 40,000 psi (pounds per square inch) and temperature of 620° C., incorporation rates for He have been found to be 0.1%. Other light nuclei can be similarly encapsulated to create the fusion fuel in accordance with this disclosure.

In the fourth method, a material is encapsulated within a fullerene by ion injection or ion collision. In one known approach, the material to be injected is ionized and a collision is forced between the ionized body and the fullerene. Lithium and beryllium have been encapsulated by others using this approach. Also in work done by others, tritium has been encapsulated and helium has been injected into dodecahedrane, each by using this technique.

Ion implantation (e.g., using known techniques to insert a pair of light nuclei into a fullerene) is an effective method for production of the fusion fuel. This technique is explained in detail in Shimshi, et al., "Beam Implantation: A New Method for Preparing Cage Molecules Containing Atoms at High Incorporation Levels," pp. 1163-1164, *J. Am. Chem. Soc.*, Vol. 119, 1997. Ion implantation is currently one preferred approach since it allows for a specific implantation of the light nuclei DT and DD, which are desirable materials for fusion.

Figure 2:
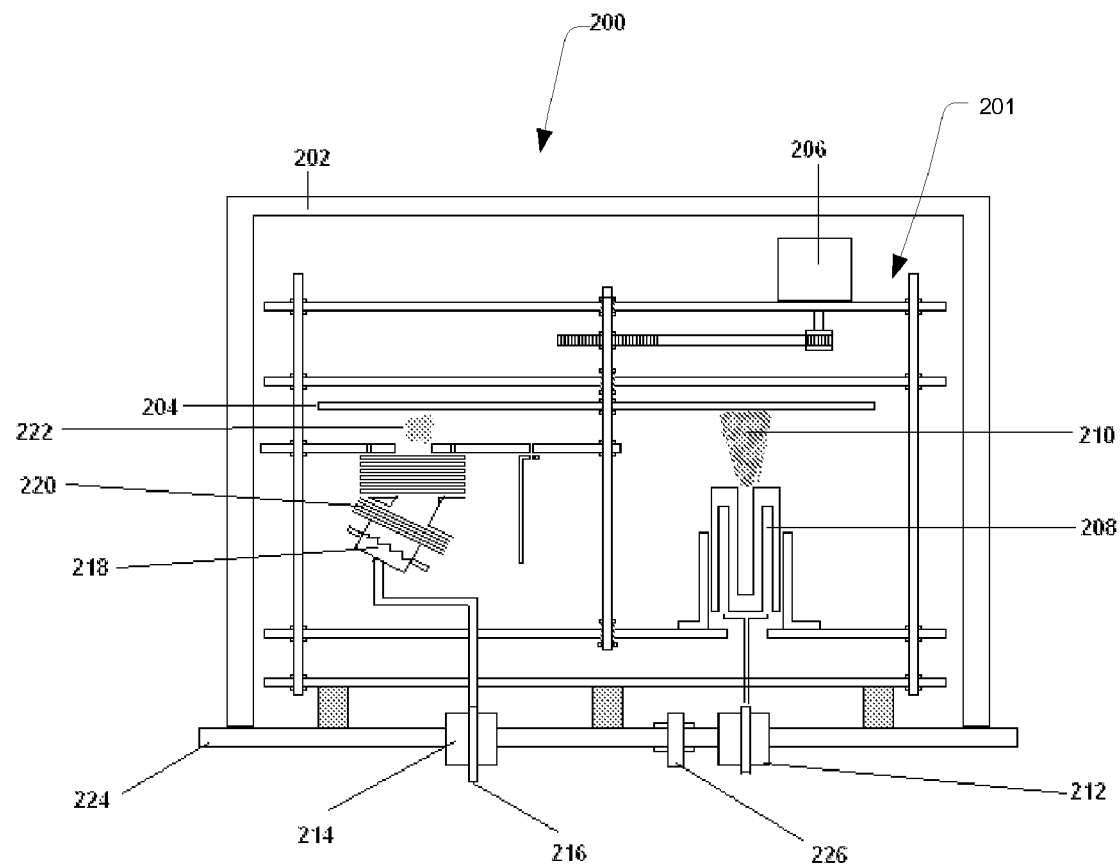
FIG. 2 illustrates an ion implantation system.

FIG. 2 illustrates an ion implantation system 200, according to an exemplary embodiment, that may be used to form a fusion fuel as described herein. In this specific example system 200, an assembly 201 is placed within a vacuum chamber 202 and the pressure is lowered to about $10^{-4}$ torr through a connection 226 through the baseplate 224 to a vacuum pump (not shown). An insulated metal disc 204 rotatably supported by the assembly 201 is made to rotate by an electric motor 206. The top hole in the heater 208 is filled with fullerene material and is brought to about 500° C. via electricity provided through the power feedthrough 212. The fullerene sublimates onto the rotating disc 204 as indicated by reference number 210. Light nuclei are introduced into the assembly 201 in a very fine amount through the gas feedthrough 214. A tungsten filament 218 is suspended near the input for the light nuclei. The filament 218 is powered at about 5-50 milliamps by 50-100 volts via the power feedthrough 212 to generate an ion beam of ionized light nuclei. Ion lenses 220 are powered at about 100 microamps by 100 volts also via the power feedthrough 212. The ion beam of light nuclei is bent by 30-90 degrees and then directed to the rotating cylinder where it emerges as indicated by reference number 222. It should be noted that the foregoing ion beam system is only one of many possible systems for implanting fusion fuel atoms in fullerene container molecules.

Once contained, deuterium for example may be modified. Specifically, neutron bombardment can be used to transform encapsulated deuterium-deuterium fusion fuel into encapsulated deuterium-tritium fuel or alternatively into external deuterium fuel. In addition, light nuclei may subsequently be added to the external structure of the cage-like molecule container, as described below.

External Light Nuclei

As mentioned above with respect to the basic structural forms of the container and light nuclei forming a fusion fuel, light nuclei may be externally attached to the cage-like molecule either in addition to or without the use of encapsulated light nuclei. See FIGS. 1-4. Exohedral addition of, for example, hydrogen, deuterium, tritium, beryllium, lithium-6, lithium-7, or boron, to a fullerene molecule may be done using known techniques for externally attaching an atom to a fullerene.

Figure 3:
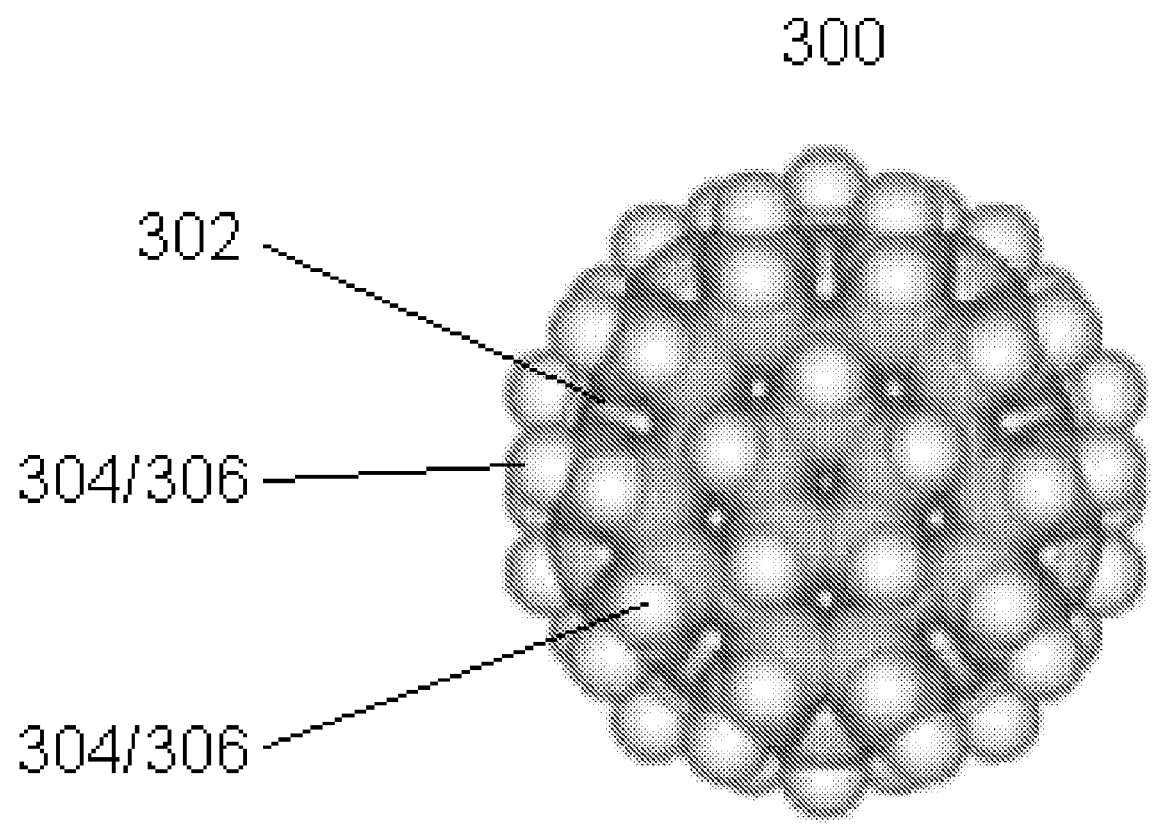
FIG. 3 illustrates a cage-like molecule with external light nuclei.

FIG. 3 shows an externally deuterated and/or tritiated fullerene 300 in which the fullerenes 302 have one or more deuterium atom 304 or tritium atom 306 externally attached to the fullerene 302. The fullerene 302 may or may not already have one or more encapsulated light nuclei as shown in FIG. 1.

For example, exohedral addition of hydrogen has been observed in which heating fullerene to 400° C. in the presence of hydrogen at 40 atm has created C60H14. Greater pressures can be used to achieve molecules having a larger number of externally attached hydrogen atoms such as, for example, 48 atoms in a C60H48 molecule. Since hydrogen, deuterium, and tritium are chemically interchangeable, this process also may be used to provide C60D48 and C60T48 molecules. Also, a starting material of DT or a 50:50 mixture of D2:T2 may be similarly used to produce C60D24T24 molecules. Such a composition provides a high density of light nuclei in a give space.

For externally attached light nuclei, such as C60D48 discussed above, light nuclei externally located on the exterior of, for example, two or more fullerene molecules in close proximity, may be urged to combine with other light nuclei on other similarly configured fullerene or other cage-like molecule as the fullerenes and or array of fullerenes expands or compresses. With two molecules of a D2@C60 there can be at most only two combinations, but with two molecules of D2@C60D48 a total of 50 reactions may be possible, i.e. 25 maximum per fullerene molecule. Thus, varying the number of externally-attached light nuclei permits the fuel to be configured to the energy requirements of a specific application. This maximum is reduced when the fullerene molecules are chemically connected together in a multi-dimensional array.

Exohedral fullerenes are molecules where the external chemistry has been modified to enhance its properties. Exohedral modifications to fullerenes, in particular to the easily accessible C60, are possible using known techniques. Exohedral modifications of fullerenes by addition reactions have shown C60 to be reactive, and derivatives of fullerenes have been produced. Such exohedral modifications may be applied to a cage-like molecule. Specifically, exohedral modifications, or modifications to the shell or exterior of the fusion fuel may be combined with endohedral modifications, where internal light nuclei are present. The light nuclei may be endohedral only, exohedral only, or both endohedral and exohedral. Modifications may be done for various reasons as may be found to improve characteristics and/or performance (e.g., enhanced energy output or energy conversion) of the modified cage-like molecule as a fusion fuel, or to customize the cage-like molecule for specific or customized applications (e.g., propulsion or power generation, or type of reactor or ignition method). In general, it is expected that endohedral fullerenes may be modified with existing and future exohedral chemistry techniques involving external molecules.

In one form of modification, the surfaces of fullerene cage-like molecules may in general be derivatized by applying known derivatization methods useful with fullerene and nanotube molecules. Numerous functional groups can be attached to the surface of the fullerenes, including, but not limited to, the following light nuclei: hydrogen, deuterium, tritium, nitrogen, carbon, lithium, and boron.

Yet other forms of exohedral modification of the fusion fuel that may be used are the exohedral addition of reflector, tamper, pusher, and/or high-Z materials (e.g., as such materials are presently used in known internal confinement fusion methods). These materials include, but are not limited to, beryllium, bismuth, cesium, gadolinium, gold, hafnium, lead, mercury, palladium, platinum, plutonium, polonium, silver, tantalum, thorium, tungsten, uranium. The addition of the foregoing materials permits enhancements to the fusion fuel to provide the features of more-even heating, neutron reflection, and other features specific to each configuration. Examples of cage-like molecules that may be modified in this way include C60.

Figure 4:
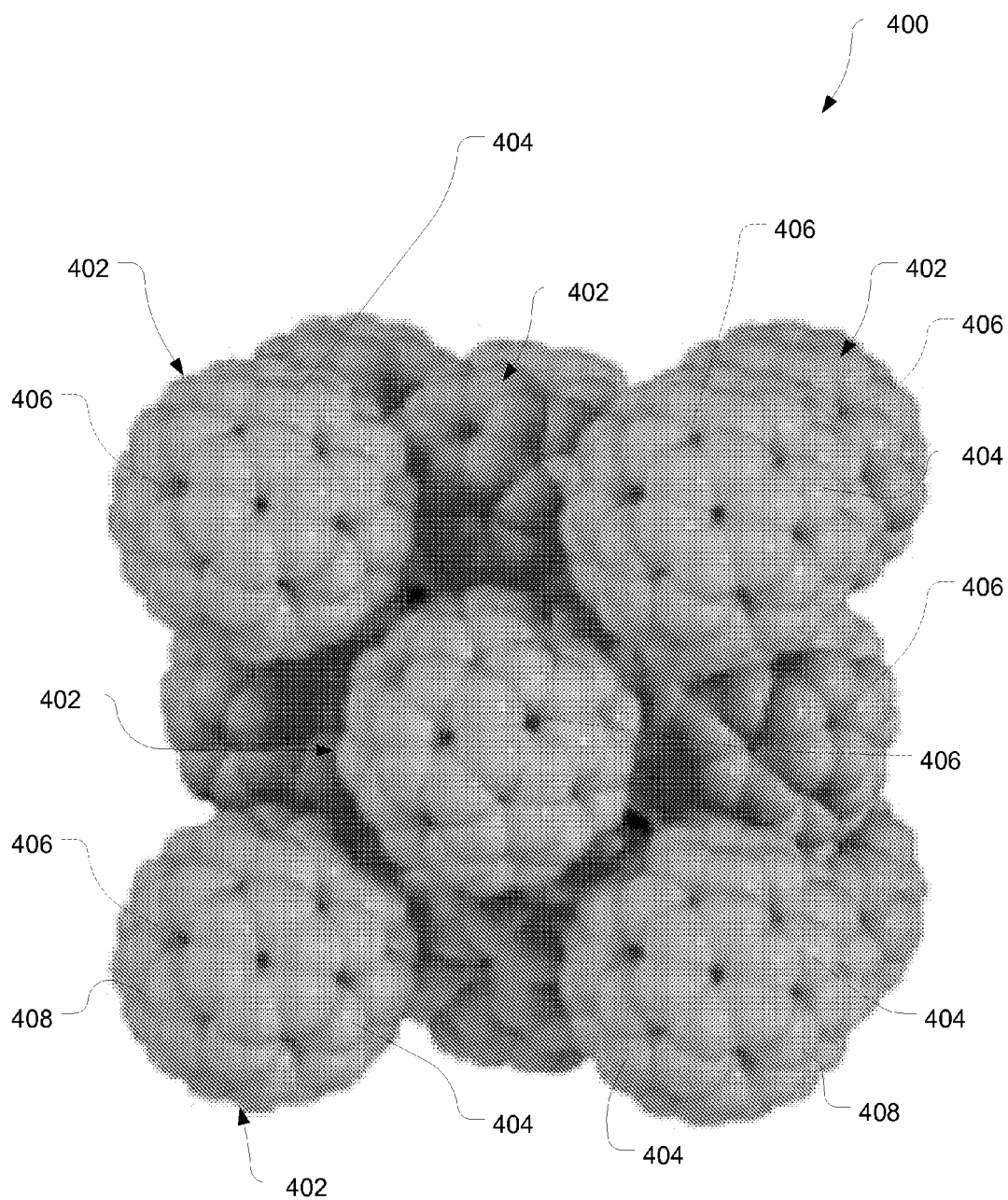
FIG. 4 illustrates an array of cage-like molecule containers with external light nuclei in an array structure.

Another form of exohedral modification is the addition to the cage-like molecule fuel container of an energetic material such as a nitro group. One chemical example is D2@C60 $(NO_2)_8$. An example of such a cage-like molecular array structure is shown in FIG. 4. Cage-like molecular array 400 is comprised of an organized structure of fullerenes 402 chemically connected, in this example, in a cubic structure wherein each fullerene 402 may have encapsulated a pair or more of light nuclei (indicated by dashed reference numeral 406) and may also have externally attached light nuclei 404. Further, some of the fullerenes may be configured with an attached nitro group 408.

Heterofullerenes are derivatives of fullerenes in which one or more carbon atoms are replaced by other elements. Such heterofullerenes may generally be used as a cage-like molecule container device in a fusion fuel. For example, instead of a C60 fullerene, one or more carbons in the shell may be replaced with nitrogen to provide the structure C69N1. There have also been fullerenes with multiple-substituted nitrogen atoms such as C48N12. Such nitrogen-substituted fullerenes are sometimes referred to as azafullerenes. Boron is also a known replacement element that may be used when forming a heterofullerene cage-like molecule. Azafullerenes as applied herein may take the form of D2@C59N1$(NO_2)_8$, etc. Fullerenes comprised entirely of nitrogen, such as N60, also could be used as an energetic cage-like molecule.

Cage-like molecular containers, or supports, for light nuclei can incorporate molecular structures that act as explosive devices to enhance the compression and temperature transient on the container device in accordance with this disclosure. One such molecular structure that could be incorporated into the cage-like molecular container is octanitrocubane ($C_8N_8O_{16}$). Heptanitrocubane ($C_8N_7O_{14}$) and CL-20 ($C_6H_6N_{12}O_{12}$) are materials for use as energetic device, cage-like molecular containers. The cage-like structure and density of energy and pressure created upon the release of energy from these molecules make these useful as energetic cage-like molecules fusion fuel container devices. Some examples of combination compositions include D2@C60D36$(NO_2)_8$ and DT@C60D13T13$(NO_2)_8$.

Other forms of modification include compositions where a mixture of light nuclei within cage-like molecules is combined in a mixture with one or more enhancement groups. The enhancement groups are not chemically bound to the cages but remain chemically independent. This allows for a composition such as D2@C60 in a 50:50 mixture with tungsten, which would manifest itself as 50% D2@C60 and 50% W by mole.

Additional forms of modification include compositions in which a mixture of light nuclei and cage-like molecules is combined in a mixture with energetic compositions or with an energetic composition and a binding composition. Energetic compositions such as CL-20 and RDX may be used as examples. Example materials include a mixture of 50% D2@C60D36 and 50% RDX by mole.

Other forms of cage-like devices include a mixture of light nuclei and cage-like molecules combined with one or more enhancement groups and one or more energetic groups. An example of such a composition is 50% CL-20, 25% DT@C60, and 25% Au.

For the purification and enrichment of endohedral materials, the purification of endohedral fullerenes may be done, for example, via chromatographic fractionation. The fullerene and encapsulated light nuclei fullerene extracts may be extracted using toluene, carbon disulfide, or other appropriate solvents. They could also be separated by methods such as gaseous diffusion or factional sublimation, which should yield greater volumes.

Some compositions described herein may generally achieve some advantage from the leveraging of the repulsive force of the cage-like molecule (e.g., a fullerene) under extreme temperature and pressure conditions to overcome the coulomb repulsion of light nuclei encapsulated in the cage-like molecule. By decreasing the cage size, and therefore decreasing the internal space within the fullerene, the distance between the light nuclei will be decreased and combining of the light nuclei encouraged.

The cage-like container and enclosed light nuclei permits the compression and containment of the light nuclei. The cage-like container also can transfer temperature changes to the contained light nuclei.

The container and light nuclei fusion fuel as more fully described herein may be used with a variety of compression methods including but not limited to particle beams, energy beams, electromagnetic waves, mechanical and or kinetic means, high explosives, magnetized compression, sonoluminesence or compression by sound, or similar shock compression methods to generate the heat and pressure necessary to fuse the light nuclei.

The caged-nuclei molecular container device fusion fuels are suitable for use with conventional methods associated with existing inertial confinement research. These techniques of confinement include high energy particle beams. High energy particle beams include systems comprised of neutrons, protons electrons, alpha particles, atoms, etc. These beams are generally found in z-pinches, electron guns, and other devices. Common sources for high temperatures to combine nuclei are generally heavy-ion (HI) accelerators, and Z-Pinches. Electromagnetic waves which are generally comprised of photons with wavelengths including microwaves, terahertz, infrared, visible light, ultraviolet, x-rays, and gamma rays. These wavelengths have the highest energy value with gamma being most energetic and scaling down.

The cage-like molecular container devices described permit containment of the light nuclei during the application of high energy beams such as those comprised of microwaves. Applying energy beams to the confined light nuclei may be used to increase the pressure and temperature of the light nuclei within the containment. Laser systems can be either direct or indirect drive. Indirect drive systems involve the directing of a high-powered laser light at a hohlraum shell. The laser light is converted into soft x-rays, which heat and compress the light. High-average-power lasers (HAPL) HAPL systems include, but are not limited to, krypton-fluoride (HrF) gas lasers as well as diode-pumped solid-state lasers (DPSSL). High-energy petawatt (i.e., having energy greater than about $10^{15}$ watts) lasers (HEPL) are sufficient to combine nuclei. Systems which deposit energy in the femtosecond timeframe such as femtosecond lasers are also an important electromagnetic wave source. Femtosecond systems allow for rapid heating before hotspots are formed.

The caged nuclei of the fusion fuel container devices of the present disclosure are also suitable for use with colliding beam systems wherein two beams of identical or similar cage-like molecules are collided. Also, the colliding of a beam of cage-like molecules with a beam of another hard material, such as a heavy metal including Tungsten, Uranium, or Thorium, would allow for the cage to compress the light nuclei fuels and also send any neutron resulting from a fusion reaction into the hard material.

The cage-like molecular container device may also be suitable for use in systems of explosive research. A fullerene based, or other cage-like molecule, container, such as with light nuclei encapsulated, may also benefit from the addition of externally-attached energetic groups. Exploding groups can add a compressive force to encapsulated light nuclei. When the rapid removal of an externally-attached nitro group rapidly disassociates (i.e., undergo individual detonation) from the cage-like molecule, this action causes compression on the cage-like molecule and thereby decreases the internal cavity space. As the internal cavity within the cage decreases, the pressure on the light nuclei increases, which can reduce the additional energy input required to facilitate the fusion reaction to occur.

The cage molecule container device may also be suitable for use in systems of explosive research wherein an array of fullerene based, and or other cage-like molecule, containers are provided. One or more light nuclei are attachable to some of the cage-like containers forming an array of cage-like molecules with a density of light nuclei. The addition of externally-attached energetic groups adds a means to apply a compressive force to the space between the cage-like molecules during the explosion of the explosive groups. It is known that the rapid removal of an externally-attached nitro group rapidly disassociate (i.e., undergo individual detonation) from the cage-like molecule. Light nuclei externally attached to the cage-like molecules, and in close proximity, will be compressed as the array of cage-like molecules is subjected to exploding energetic groups.

When configured as a solid with energetic groups, as for example in $D2@C60D36(NO_2)_8$, and suspended in a liquid fuel (e.g., methanol ($CH_3OH$)), it is expected that chemical burners used in, for example, a conventional gas-fired power plant may be sufficient for chemical ignition of the nitro groups, thereby compressing the light nuclei and creating conditions suitable for fusion.

Chemically, ignition of energetic groups can be facilitated with a flow of heated helium. The helium is used as a carrier gas to carry thermal energy to energetic nitro groups. Heated helium may both cause explosion, i.e., ignition of the nitro groups, and provide a source of helium to a system for other reactions. Heated helium may thus be used to ignite such nitro groups on the cage-like molecular containers containing light nuclei to provide a sustainable compression of the light nuclei for a fusion reaction. Preheated helium can be used to both ignite attached energetic groups and provide additional light nuclei to the system.

The cage-like molecules enclosing or supporting light nuclei may be part of a composition mixed with enhancement groups in a blend that, while not chemically interactive, permits for the afore-mentioned enhanced effects. Also, explosive compositions such as RDX may be mixed into the composition. In addition, a composition binder may be added to keep the cage-like molecules, enhancement and/or explosive compositions bound together and to increase density.

The compositions discussed above may generally also optionally be further encapsulated within a microsphere structure such as a glass or polymeric sphere.

EXAMPLES

Several non-limiting hypothetical examples of the structure and formation of cage-like molecular devices are described herein and also presented below.

Example 1

100% D2@C60 in 8 Steps via the Komatsu Method
(10 g C60 to 1 g D2@C60)

This 8 step method, first published by Komatsu, et al., involves three phases: 1) opening a "port" into the fullerene molecule, 2) injecting light molecules into the opened fullerene molecules, and then 3) closing the port to enclose the light molecules within the fullerenes. This 8 step method is described in more detail below as an exemplary procedure. It is to be understood that the temperatures, pressures, and quantities of reactants are approximate, and greater detail is provided in the publications referenced, all of which are incorporated by reference herein in their entirety.

OPENING (Murata, et al., "Synthesis, Structure, and Properties of Novel Open-Cage Fullerenes Having Heteroatom(s) on the rim of the Orifice," pp. 1600-1609, Chem. Eur. J., 2003, 9, No. 7.) [Overall Yield 40%]

Step 1: C60 to C60:8 Member Ring (Compound 5)

A mixture of fullerene C60 (50 mg, 0.069 mmol) and 3-(2-pyridyl)-5,6-diphenyl-1,2,4-triazine (4) (21 mg, 0.068 mmol) in o-dichlorobenzene (ODCB, 4 mL) is refluxed at 180 C for 17 hours under an argon atmosphere. The resulting dark purple solution is directly subjected to flash column chromatography over silica gel. Elution with CS2 gives unreacted C60 (20 mg, 41%) while the following elution with CS2-ethyl acetate (20:1) gives an open-cage fullerene derivative 2 (35 mg, 0.035 mmol, 50%) as a brown powder (compound 5).

Step 2: C60:8 Member Ring to C60:12 Member Ring (Compound 9)

A purple solution of compound 5 (66 mg, 0.066 mmol) in CCl4 (65 mL) in a Pyrex flask is irradiated by a high-pressure mercury lamp (500 W) from a distance of 20 cm for 6 hours under air. The resulting brown solution is evaporated and the residual black solid is dissolved in ODCB (3 mL). This is subjected to preparative HPLC using a Cosmosil 5PBB column (10×250 mm) eluted with ODCB (flow rate, 2 mL/min) to afford open-cage fullerene derivative compounds 9 (40 mg, 0.038 mmol, 60%, retention time: 8.7 min), 10 (21 mg, 0.020 mmol, 31%, retention time: 9.2 min), and 11 (1 mg, 0.001 mmol, 2%, retention time: 9.1 min), after nine recycles, all as brown powders.

Step 3: C60:12 Member Ring (Compound 9) to C60:13 Member Ring (Compound 15)

To a heated and stirred solution of compound 9 (32 mg, 0.031 mmol) and elemental sulfur (8 mg, 0.031 mmol as S8) in ODCB (15 mL) is added to tetrakis (dimethylamino) ethylene (7.1 microL, 0.031 mmol) at 180 C. The solution is refluxed at 180 C for 30 minutes then the resulting dark red-brown solution is concentrated by evaporation to about 3 mL. This residual is added to pentane (30 mL) with vigorous stirring to give brown precipitates. The precipitates, collected by centrifuge, are dissolved in ODCB (2 mL). The resulting solution is subjected to flash chromatography on silica gel eluted with toluene/ethyl acetate (30:1) to give an open-cage fullerene derivative compound 15 (25 mg, 0.023 mmol, 77%) as a brown powder.

INJECTING (Murata, et al., "100% Encapsulation Of A Hydrogen Molecule Into An Open-Cage Fullerene Derivative And Gas-Phase Generation of $H_2@C_{60}$," pp. 7152-7153, J. AM. Chem. Soc., 2003, 125) [Overall Yield 100%]

Step 4: D2+C60:13 Member Ring (Compound 15) to D2@C60:13 Member Ring

Compound 15 is then placed in an environment of D2 at 800 atm and 200 C for 8 hours. This yields 100% encapsulation of the D2 in the open compound 15 fullerene.

CLOSING (Komatsu, et al., "Encapsulation Of Molecular Hydrogen In Fullerene $C_{60}$ By Organic Synthesis," pp. 238-240, SCIENCE, Jan. 14, 2005, Vol. 307) [Overall Yield 22%]

Step 5: D2@C60:13M(Sulfide) to D2@C60:13M(Sulfoxide)

The encapsulated compound 15 from step 4 is then subjected to m-CPBA and Toluene at room temperature for 13 hours. (Yield 99%).

Step 6: D2@C60:13M(Sulfoxide) to D2@C60:12M

The resultant encapsulated compound 15 from step 5 is then subjected to Visible Light and Toluene at room temperature for 17 hours (Yield 42%).

Step 7: D2@C60:12M to D2@C60:8M

The resultant encapsulated compound 15 from step 6 is subjected to TiCl4, Zn with ODCB/THF at 80 C for 2 hours (Yield 88%).

Step 8: D2@C60:8M to D2@C60

The resultant material is then held under Vacuum at 34° C. for 2 hours (Yield 61%).

Example 2

D2@C60 and DT@C60 via Ion Injection: A system for ion beam implantation within a vacuum chamber as described above is used. A C60 fullerene (acquired from SES Research) is placed into a heater and heated to a temperature between 400-700° C. The evaporated fullerene attaches itself as a thin layer to a rotating disk or cylinder to be bombarded with light nuclei. The light nuclei, in this case D2 (acquired from Praxair), are introduced into the ion beam system at low pressure (e.g., about less than $10^{-2}$ torr) and then accelerated to ion energies of between 5-200 eV. The light nuclei are thereby injected into the fullerene cage-like molecule containers. This gives D2@C60 with total incorporation fractions of about $1\times10^{-11}$ and greater (expressed as total number of moles of gas in sample).

DT@C60 may be acquired by two methods. Since tritium is a byproduct of neutron capture in a deuterium nuclei a method is to acquire tritium and blend the singular ions of D and T together to give a DT gas molecule. The light nuclei, in this case DT gas molecules, is then introduced into the ion beam system at low pressure and accelerated to ion energies of between 5-200 eV. The light nuclei are thereby injected into the fullerene cage-like molecular container. This gives DT@C60 with total incorporation levels of about $1\times10^{-11}$ and greater (expressed as total number of moles of gas in sample).

Example 3

6LiD@C70 via Formation Encapsulation: A thin wire of 6LiD is procured. 6Li in this case means the number 6 isotope of lithium. The method is similar to the arc-vapor process for making fullerenes such as described in U.S. Pat. Nos. 5,227, 038 and 5,275,705, which are incorporated herein by reference. This process is the consumption of composite graphite rods, which contain the light nuclei to be encapsulated, in an electrical arc in an inert atmosphere, such as helium or argon, and the simultaneous condensation of the resulting soot. Alternatively, fullerene-encapsulated light nuclei may be produced in sooting benzene flames, with the light nuclei vapor introduced into the flames, or by induction heating of composite rods with RF energy. An example of the benzene approach is disclosed in J. T. McKinnon, et al., "Combustion Synthesis of Fullerenes," pp. 223-224, *Combustion and Flame*, Vol. 88, pp 102-112, 1992, which is incorporated herein for all purposes. The RF energy approach is disclosed in G. Peteres, et al., "A New Fullerene Synthesis," *Agnew. Chem. Int. Ed. Engl.*, Vol. 31, 1992, which is also incorporated herein by reference for all purposes.

Example 4

D2@C60D12: The procedure of Example 1 is used to obtain encapsulated D2@C60. The D2@C60 is inserted into a suitable pressure vessel. Removal of all external air is done with use of vacuum pump. The fullerene is heated to 400° C. in the presence of deuterium at 30 to 60 atm to create exohedral D2@C60D14. Since the molecules of hydrogen, deuterium, and tritium are interchangeable chemically, the pressurization to achieve hydrogenated, deuteriated, and tritiated compounds is similar. It is noted that the use of greater pressures will lead to D2@C60D36, increasing to D2@C60D48, and finally approaching D2@C60D60, which, if reached, would unacceptably break down the fullerene structure. C60 also may undergo Birch reduction (Li, liquid $ND_3$, t-BuOD). The resulting material will be C60D36.

Example 5

D2@C60($NO_2$)$_8$ via Nitration of Fullerenes: Fullerenes undergo nitration very similarly to other organic compounds. The nitration methods used for creating organic explosives such as high explosives or secondary explosives may also be used to create nitrofullerene compounds. Such methods for nitration include the action of greater than 70% nitric acid on a fullerene compound. Basically nitric acid is mixed with copper and nitric oxide is bubbled through the fullerenes dissolved in Toluene to form nitro-fullerene in this process. Polyhydroxynitrofullerenes are also possible when you add these polynitrofullerenes to hexane.

Examples 6-8

D2@C60D36($NO_2$)$_8$: Obtain D2@C60D36 as formed in Example 4. Repeat the process for nitration as described in Example 5 for D2@C60. DT@C60Dx($NO_2$)$_x$ nitration of DT@C60 complexes is done in the same way as for nitration on D2@C60 complexes. Similar methods apply for 6LiD@C60 nitration.

D2@C60D36: Exohedral fullerenes which contain light nuclei may be created without endohedral components. Following the pressurization method described above, C60Li is obtained. The composition of D2@C60D36 is mixed with Au to give a 50:50 ratio by mole of D2@C60D36 and Au. This composition may be enhanced further with the addition of a chemically energetic material such as CL-20. D2@C60D36 may also be obtained by the methodology disclosed by Darwish, et al., "Polyhydrogenation of [60]- and [70]-Fullerenes," pp 2359-2365, *J. Chem. Soc. Perkin Trans.*, 1995, Vol. 2. In this method, basically, Zinc is added to a saturated solution of C60 fullerene in either benzene or toluene maintained under a nitrogen atmosphere without exposure to light, at room temperature. DCl then added resulting in rapid conversion of C60 to C60D36.

D2@C60Mixtures: D2@C60 is formed using the ion beam or chemical methods described above. The D2@C60 is then mixed with a chemically energetic material such as RDX to provide a mixture of 50:50 D2@C60/RDX by mole.

The foregoing description of specific implementations reveals the general nature of the disclosure sufficiently that others can, by applying current knowledge, readily modify and/or adapt it for various applications without departing from the generic concept. For example, although the disclosure was generally presented above in the context of a carbon-based fullerene, in other implementations the container or support system may be comprised of other materials such as nitrogen, silicon, etc. Therefore, such adaptations and modifications are within the meaning and range of equivalents of the disclosed embodiments. The phraseology or terminology employed herein is for the purpose of description and not of limitation. Since certain changes may be made in the above system and or apparatus without departing from the scope of the disclosure herein involved, it is intended that all matter contained in the above descriptions, and as shown in the accompanying drawings, shall be interpreted in an illustrative, and not a limiting sense.

What is claimed is:

1. A fusion fuel for use in a fusion reaction, comprising:
   a cage-like molecule;
   two light nuclei encapsulated in the cage-like molecule, wherein the two light nuclei are suitable for use as reactants in the fusion reaction;
   a first light nuclei externally attached to the cage-like molecule;
   a second light nuclei externally attached to the cage-like molecule;
   wherein the first external light nuclei is selected from the group consisting of: deuterium, tritium, and hydrogen; and
   wherein the second external light nuclei is lithium.

2. The fusion fuel of claim 1 wherein the first external light nuclei and the second external light nuclei are attached to the cage-like molecule in the form of lithium deuteride.

3. The fusion fuel of claim 2 wherein the fusion fuel is DT@C60LiD.

* * * * *